US012580348B2

(12) United States Patent
Jeong et al.

(10) Patent No.: US 12,580,348 B2
(45) Date of Patent: Mar. 17, 2026

(54) CONNECTING APPARATUS

(71) Applicants: KMW INC., Hwaseong-si (KR); TELCON RF PHARMACEUTICAL. INC., Yongin-si (KR)

(72) Inventors: Bae Mook Jeong, Suwon-si (KR); Seong Min Ahn, Namyangju-si (KR); Min Hee Lee, Yongin-si (KR); Kong Moo Heo, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 482 days.

(21) Appl. No.: 17/975,649

(22) Filed: Oct. 28, 2022

(65) Prior Publication Data

US 2023/0047023 A1 Feb. 16, 2023

Related U.S. Application Data

(63) Continuation of application No. PCT/KR2021/005414, filed on Apr. 29, 2021.

(30) Foreign Application Priority Data

Apr. 29, 2020 (KR) ........................ 10-2020-0052772

(51) Int. Cl.
*H01R 13/00* (2006.01)
*H01R 12/72* (2011.01)
(Continued)

(52) U.S. Cl.
CPC ......... *H01R 13/6473* (2013.01); *H01R 12/72* (2013.01); *H01R 13/15* (2013.01); *H01R 13/2421* (2013.01); *H01R 24/40* (2013.01)

(58) Field of Classification Search
CPC .... H01R 12/72; H01R 13/15; H01R 13/2421; H01R 24/40
See application file for complete search history.

(56) References Cited

U.S. PATENT DOCUMENTS 7,097,460 B2 8/2006 Clark et al.
8,337,256 B1 * 12/2012 Lin .................... H01R 12/7094 439/700

FOREIGN PATENT DOCUMENTS

JP H07-57808 A 3/1995
JP 2997155 B2 1/2000
(Continued)

OTHER PUBLICATIONS

Extended European Search Report mailed on Apr. 3, 2024 from the European Patent Office for European Application No. 21795319.9.
(Continued)

*Primary Examiner* — Phuong Chi Thi Nguyen

(57) ABSTRACT

The present invention relates to a connecting apparatus including a fixed terminal part having a hollow portion and fixed in a predetermined space between a first substrate, on which electrical components are mounted, and a second substrate disposed in parallel with the first substrate, one terminal part fixed to one end of the fixed terminal part and configured to be elastically supported on the first substrate, one terminal part being configured to slip and come into contact with an inner surface of the first substrate, and the other terminal part fixed to the other end of the fixed terminal part and configured to be elastically supported on the second substrate, the other terminal part being configured to slip and come into contact with an inner surface of the second substrate, in which one terminal part and the other terminal part are elastically supported by an elastic member installed in the hollow portion of the fixed terminal part and configured to be extended or contracted, thereby providing an advantage of easily absorbing assembling tolerance existing between two substrates and provides a very simple assembling process.

12 Claims, 9 Drawing Sheets

(51) Int. Cl.

| | |
|---|---|
| ***H01R 13/15*** | (2006.01) |
| ***H01R 13/24*** | (2006.01) |
| ***H01R 13/6473*** | (2011.01) |
| ***H01R 24/40*** | (2011.01) |

(56) References Cited

FOREIGN PATENT DOCUMENTS

| | | | |
|---|---|---|---|
| JP | 2004-152536 | A | 5/2004 |
| JP | 2006-098254 | A | 4/2006 |
| JP | 2019-175850 | A | 10/2019 |
| JP | 2020-506616 | A | 2/2020 |
| KR | 10-2011-0041919 | A | 4/2011 |
| KR | 10-2012-0029981 | A | 3/2012 |
| KR | 10-1398156 | B1 | 5/2014 |
| KR | 10-1926503 | B1 | 12/2018 |
| KR | 10-2019-0128948 | A | 11/2019 |
| WO | 2017/188595 | A1 | 11/2017 |

OTHER PUBLICATIONS

International Search Report mailed Aug. 6, 2021 for International Application No. PCT/KR2021/005414 and its English translation.

Non-final office action mailed Nov. 4, 2021 for Korean Application No. 10-2020-0052772.

Non-final Office Action mailed Nov. 7, 2023 from the Japanese Patent Office for Japanese Application No. 2022-566501.

* cited by examiner (a) (b)

CONNECTING APPARATUS

CROSS-REFERENCE TO RELATED APPLICATIONS

This application is a continuation application of International Application No. PCT/KR2021/005414, filed Apr. 29, 2021, which claims the benefit of Korean Patent Application No. 10-2020-0052772, filed Apr. 29, 2020, in the Korean Intellectual Property Office, the disclosures of which are incorporated herein in their entirety by reference.

TECHNICAL FIELD

The present invention relates to a connecting apparatus, and more particularly, to a connecting apparatus capable of connecting an electrical signal between two substrates (or two contact surfaces) having facing surfaces, easily absorbing assembling tolerance existing between the two substrates (or the two contact surfaces), and significantly improving assembling properties.

BACKGROUND ART

In general, RF communication connectors have various structures capable of easily and closely coupling coaxial cables to terminals. The RF communication connectors broadly include: an RF communication connector fastened to a terminal provided in a housing that may be identified with the naked eye; and an RF communication connector provided between two substrate members and applied to a case in which positions of connection terminals of the connector for connecting two substrates are difficult to accurately identify with the naked eye.

In particular, in a state in which a plurality of connectors is provided on one side substrate, a plurality of terminals is provided on the other side substrate, and the two substrates are disposed in an upward/downward direction, it is very difficult to couple the connector and the terminal corresponding to the connector, which requires a large amount of working time. Meanwhile, in case that an excessive force is applied, a contact point of the connector is damaged, which causes a defect in which a signal is not connected.

In case of a defect, the damaged connector needs to be replaced, which causes problems in that the work is delayed, and costs required for replacement or repair are also increased.

A structure, which is provided in consideration of the above-mentioned problems and connects the substrates through the RF connector, requires a structure and solution for rotating an interface of the connector and stably fastening the interface of the connector even in case that there is a slight difference in position at the time of fastening a counterpart (a terminal connection part).

As an example, Korean Patent No. 10-0945113 (registered on Feb. 23, 2010) discloses a printed circuit board surface mounting connector having a connector pin having a connection groove formed at a part of an upper portion thereof, in which a pin cut-out groove is provided in the connector pin at a part of a lateral surface of the connection groove, such that a difference in tolerance is provided by the pin cut-out groove, thereby allowing a pin of a counterpart connector to be more easily inserted and coupled.

However, the above-mentioned patent has a problem in that the configuration in which the cut-out groove is provided outside the connection groove of the pin inserted into an insulator cannot be considered as a structure capable of sufficiently and easily coupling the connector in a state in which the coupling cannot be identified with the naked eye.

A rotation is defined in the detailed description of the above-mentioned patent. However, the rotation is not a substantial rotation but may be considered as an improvement of tolerance implemented by the elasticity of the insulator and the cut-out groove of the pin.

Therefore, there are problems in that the RF connectors for connecting the substrates in the related art do not perform the rotation, and it is impossible to provide the stable connection of the connectors when the substrates, which cannot be identified with the naked eye, are coupled.

In addition, the above-mentioned patent discloses the structure that does not have a leftward or rightward clearance made by the cut-out groove and the elasticity of the insulator. For this reason, damage, such as bending of the inserted pin, may occur in case that an excessive coupling force is applied during the coupling process.

DISCLOSURE

Technical Problem

The present invention has been made in an effort to solve the above-mentioned technical problems, and an object of the present invention is to provide a connecting apparatus capable of connecting an electrical signal between two substrates (or two contact surfaces) provided to face each other and easily absorbing assembling tolerance between the two substrates (or the two contact surfaces).

The present invention has also been made in an effort to provide a connecting apparatus that is disposed in one side space distinguished from an insertion space for a dielectric material inserted to match impedance and is capable of easily absorbing assembling tolerance existing between the connecting apparatus and a relevant PCB.

The present invention has also been made in an effort to provide a connecting apparatus installed such that one terminal part supports one side surface of a terminal pin, among components of a cavity filter, and the other terminal part is supported on a relevant PCB, such that the installation and assembly may be performed by a very simple operation of bringing the relevant PCB into contact with the cavity filter.

Technical problems of the present invention are not limited to the aforementioned technical problems, and other technical problems, which are not mentioned above, may be clearly understood by those skilled in the art from the following descriptions.

Technical Solution

An embodiment of the present invention provides a connecting apparatus including: a fixed terminal part having a hollow portion and fixed in a predetermined space between a first substrate, on which electrical components are mounted, and a second substrate disposed in parallel with the first substrate; one terminal part fixed to one end of the fixed terminal part and configured to be elastically supported on the first substrate, one terminal part being configured to slip and come into contact with an inner surface of the first substrate; and the other terminal part fixed to the other end of the fixed terminal part and configured to be elastically supported on the second substrate, the other terminal part being configured to slip and come into contact with an inner surface of the second substrate, in which one terminal part and the other terminal part are elastically supported by an elastic member installed in the hollow portion of the fixed terminal part and configured to be extended or contracted.

In this case, one terminal part and the other terminal part may be coupled to overlap ends of the fixed terminal part by predetermined distances in a longitudinal direction.

In addition, one terminal part and the other terminal part respectively may have hollow portions into which ends of the fixed terminal part are inserted, and one terminal part and the other terminal part may respectively hook-engage with the fixed terminal part while surrounding outer peripheral surfaces of the ends of the fixed terminal part.

In addition, one terminal part and the other terminal part may respectively have hollow portions into which ends of the elastic member are inserted and supported, and one terminal part and the other terminal part may be inserted into the hollow portion of the fixed terminal part while overlapping the fixed terminal part and respectively hook-engage with inner sides of inlet ends of the hollow portion of the fixed terminal part.

In addition, the elastic member may have one end inserted and supported in the hollow portion of one terminal part, and the other end inserted and supported in the hollow portion of the other terminal part.

In addition, one terminal part and the other terminal part may each have a plurality of cut-out portions formed by cutting a part of an outer peripheral surface of a portion of each of one terminal part and the other terminal part, which is coupled to the fixed terminal part, in a longitudinal direction, and the plurality of cut-out portions may be spaced apart from one another in a circumferential direction.

In addition, a contact point end of one terminal part, which is configured to come into contact with the first substrate, and a contact point end of the other terminal part, which is configured to come into contact with the second substrate, may each include a plurality of protrusion portions protruding to implement at least two point contact points.

In addition, a contact point end of one terminal part, which is configured to come into contact with the first substrate, and a contact point end of the other terminal part, which is configured to come into contact with the second substrate, may each include a contact point groove formed to be recessed, and a contact point flat surface formed to be flat at the periphery of the contact point groove.

Another embodiment of the present invention provides a connecting apparatus including: a cavity filter having one side fixed to a resonant element and having a terminal pin fixed in an impedance matching space provided to match impedance in a radial direction; and an RF connector configured to absorb assembling tolerance between the terminal pin and a relevant PCB and fixed in the impedance matching space between the terminal pin and the relevant PCB disposed in parallel with and spaced apart, by a predetermined distance, from the resonant element, in which the RF connector includes: a fixed terminal part having a hollow portion; one terminal part fixed to one end of the fixed terminal part and configured to be elastically supported on the terminal pin, one terminal part being configured to slip and come into contact with a contact surface of the terminal pin; and the other terminal part fixed to the other end of the fixed terminal part and configured to be elastically supported on the relevant PCB, the other terminal part being configured to slip and come into contact with a contact surface of the relevant PCB, and in which one terminal part and the other terminal part are elastically supported by an elastic member installed in the hollow portion of the fixed terminal part and configured to be extended or contracted.

In addition, an outer surface area of the other end of the terminal pin may be larger than an outer surface area of one end of one terminal part of the RF connector.

In addition, the impedance matching space of the cavity filter may be fitted with the terminal pin to cover a part of an outer peripheral surface of the terminal pin, or a terminal pin side dielectric material may be inserted into the impedance matching space so as to be disposed in a radial direction of the outer peripheral surface of the terminal pin, such that impedance matching is designed.

In addition, a cavity, which corresponds to the outside of the impedance matching space of the cavity filter, may be fitted with the fixed terminal part to cover a part of an outer peripheral surface of the fixed terminal part of the RF connector, or a fixed terminal part side dielectric material may be inserted into the cavity so as to be disposed in a radial direction of the outer peripheral surface of the fixed terminal part, such that impedance matching is designed.

In addition, the RF connector may further include a fixing block configured to fix the fixed terminal part in the cavity, which corresponds to the outside of the impedance matching space of the cavity filter, by means of the fixed terminal part side dielectric material.

Advantageous Effects

The embodiment of the connecting apparatus according to the present invention may achieve the following various effects.

First, one terminal part and the other terminal part may be provided between the two substrates (or the two contact surfaces) and slip based on the fixed terminal part in a state in which the flow of elasticity is not disconnected, which makes it possible to improve the reliability of the product.

Second, the RF connector for electrically connecting the cavity filter and the relevant PCB may be provided, and the RF connector may easily absorb the assembling tolerance existing outside the cavity filter.

Third, the assembling process may be performed by a simple operation of fixing the RF connector to the relevant PCB by soldering and applying an assembling force to bring the relevant PCB into contact with the cavity filter, which makes it possible to improve the assembling properties.

Fourth, the terminal pin may be fixedly installed in the cavity filter, which makes it easy to design impedance matching.

The effects of the present invention are not limited to the aforementioned effects, and other effects, which are not mentioned above, will be clearly understood by those skilled in the art from the claims.

EXPLANATION OF REFERENCE NUMERALS AND SYMBOLS

Figure 1:
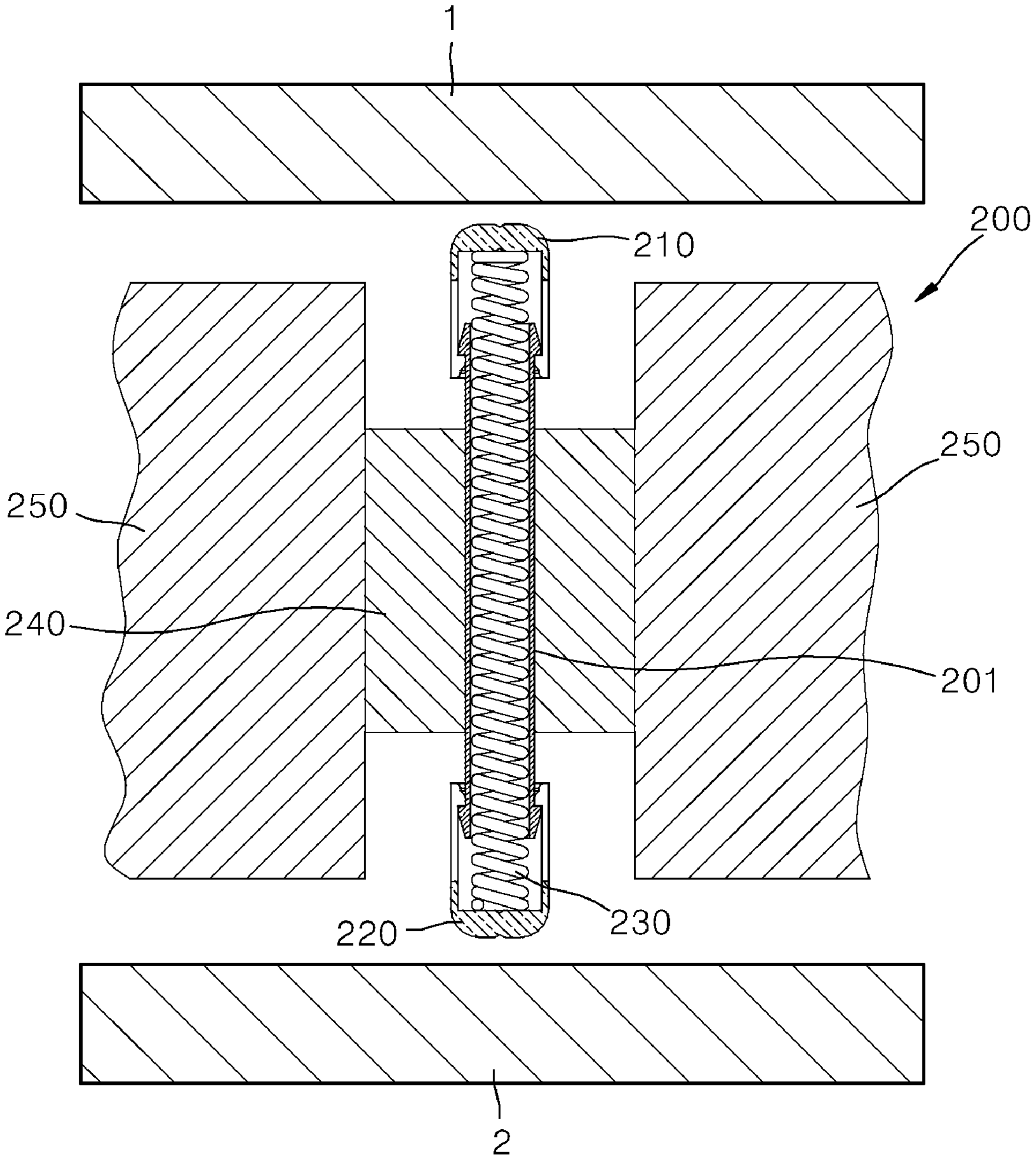
FIGS. 1 and 2 are assembled cross-sectional views illustrating a state in which two substrates are connected by a connecting apparatus according to an embodiment of the present invention.

1: First substrate
2: Second substrate
100: Cavity filter
103: Resonant element
105: Filter main body
110: Impedance matching space
120: Terminal pin
121: The other end of terminal pin
122: One end of terminal pin
123: Fixing rim
130: Terminal pin side dielectric material
131: First terminal pin side dielectric material
132: Second terminal pin side dielectric material
200: RF connector
210: One terminal part
213: Hollow portion
214: Inward hook rib
220: The other terminal part
223: Hollow portion
224: Inward hook rib
230: Elastic member
240: Fixed terminal part side dielectric material
250: Fixing block
251: Catching portion
L1, L2: Movement distance
C: Cavity

BEST MODE

Hereinafter, some embodiments of the present invention will be described in detail with reference to the illustrative drawings.

In giving reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention.

In addition, the terms such as first, second, A, B, (a), and (b) may be used to describe constituent elements of the present invention. These terms are used only for the purpose of discriminating one constituent element from another constituent element, and the nature, the sequences, or the orders of the constituent elements are not limited by the terms. Throughout the specification, unless explicitly described to the contrary, the words “comprise” or “have” and variations such as “comprises”, “comprising”, “has”, or “having”, will be understood to imply the further inclusion of any other elements, not the exclusion of the elements. In addition, the term “unit”, “part”, “module”, or the like, which is described in the specification, means a unit that performs at least one function or operation, and the “unit”, “part”, “module” or the like may be implemented by hardware, software, or a combination of hardware and software.

Figure 2:
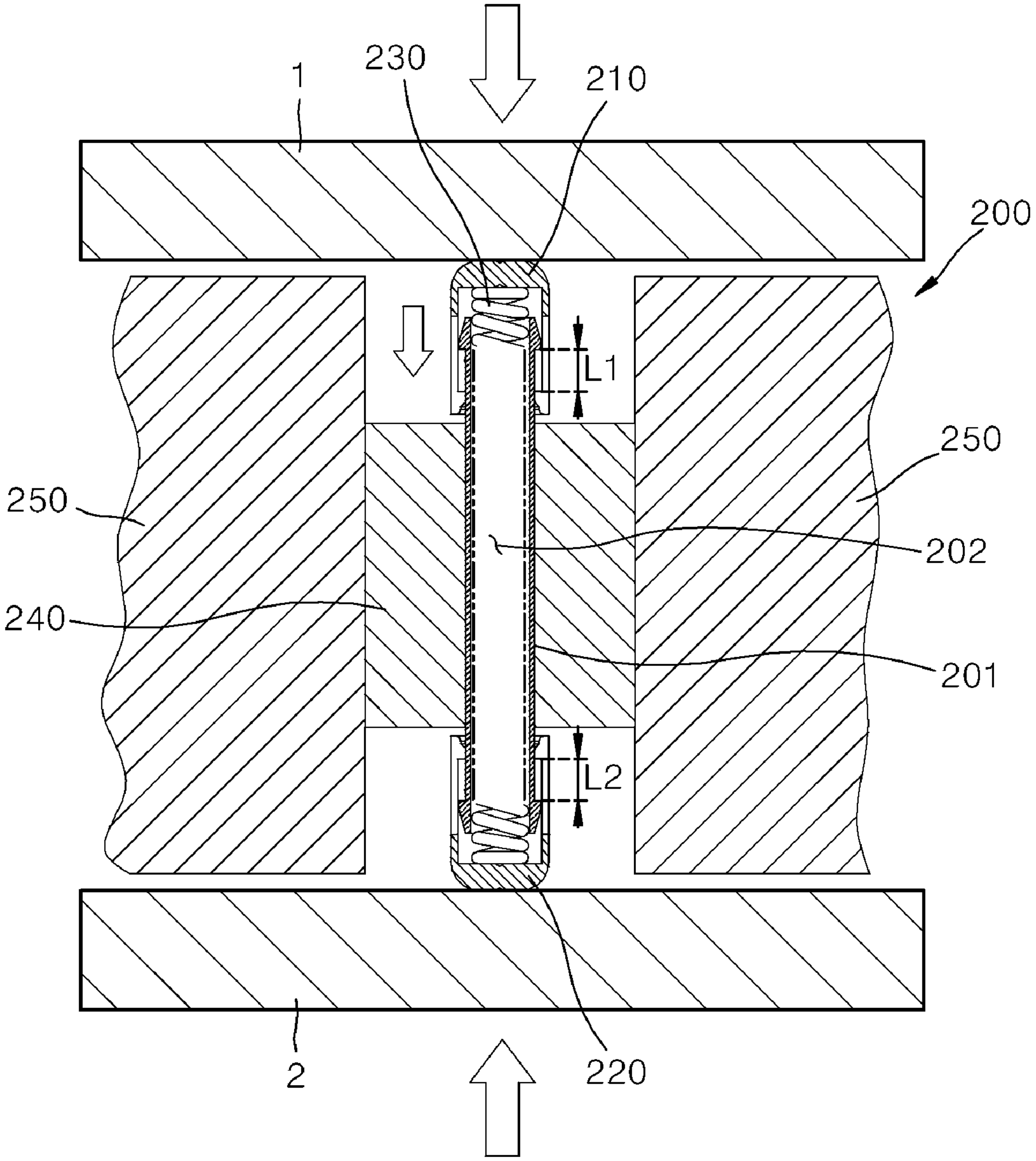
Figure 3:
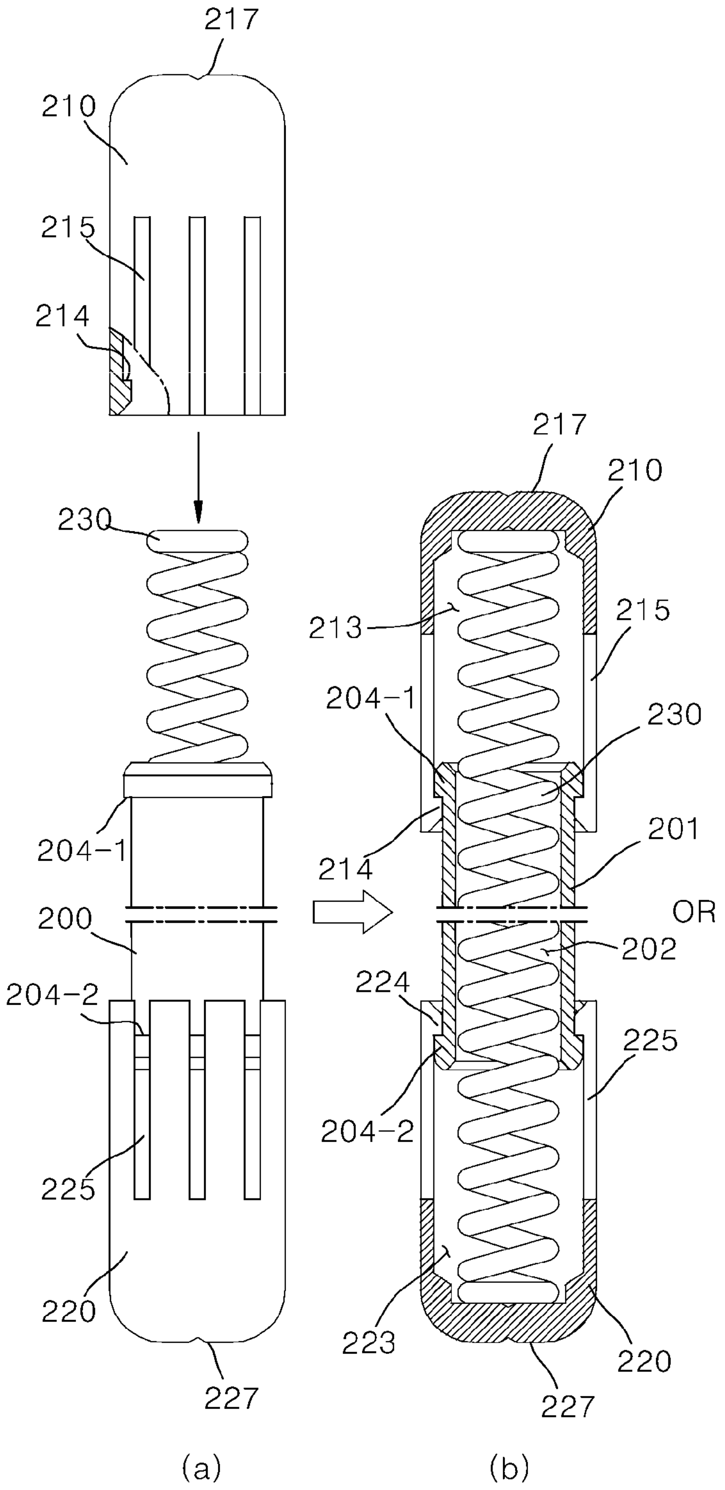
FIG. 3 is front, exploded, and cross-sectional views of an RF connector among the components in FIGS. 1 and 2.
Figure 4:
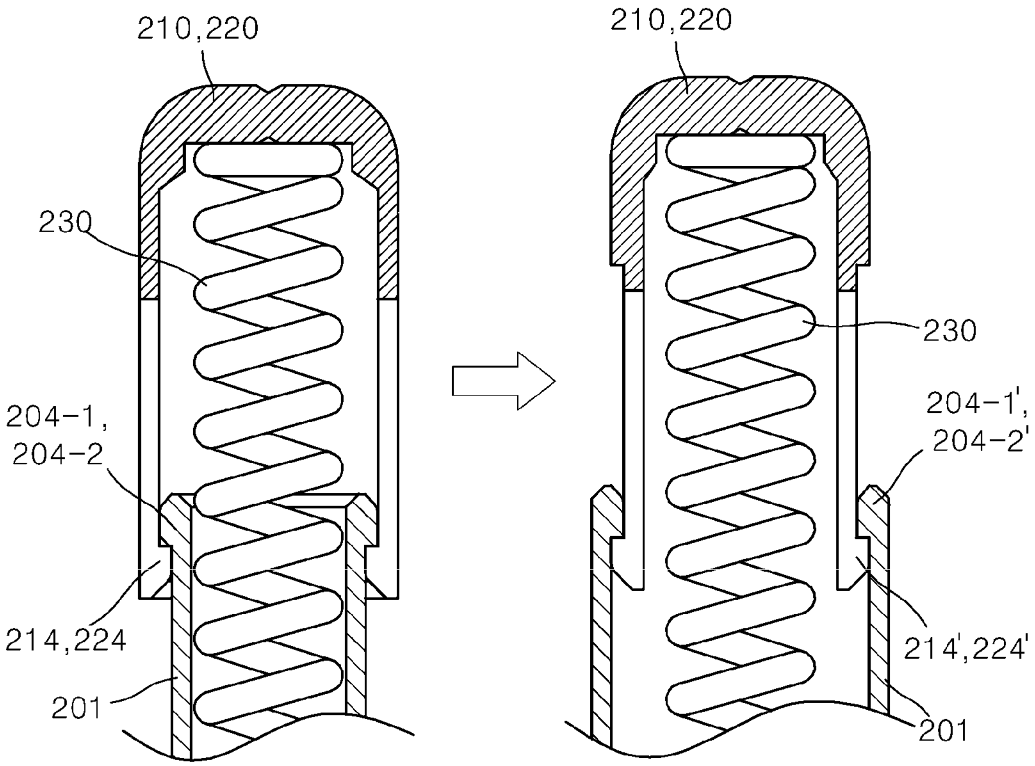
FIG. 4 is a cross-sectional view illustrating another example in which one terminal part and the other terminal part are coupled among the components in FIGS. 1 and 2.

FIGS. 1 and 2 are assembled cross-sectional views illustrating a state in which two substrates are connected by a connecting apparatus according to an embodiment of the present invention, FIG. 3 is front, exploded, and cross-sectional views of an RF connector among the components in FIGS. 1 and 2, and FIG. 4 is a cross-sectional view illustrating another example in which one terminal part and the other terminal part are coupled among the components in FIGS. 1 and 2.

As illustrated in FIGS. 1 to 3, a connecting apparatus according to the embodiment of the present invention includes an RF connector 200 fixed in a predetermined space defined between a first substrate 1 on which non-illustrated electrical components are mounted and a second substrate 2 disposed in parallel with the first substrate 1, the RF connector 200 having one side and the other side configured to absorb predetermined assembling tolerance.

In this case, the first substrate 1 and the second substrate 2 have concepts including any component, which may connect an electrical signal through the RF connector 200 and to which the RF connector 200 according to the present embodiment is applied regardless of names such as a printed circuit board (PCB) and an electric board.

The RF connector 200 is installed between the first substrate 1 and the second substrate 2 and connects an electrical signal between the two substrates (the first substrate 1 and the second substrate 2). Meanwhile, the RF connector 200 serves to automatically eliminate assembling tolerance existing between the first substrate 1 and the second substrate 2 by using an assembling force by an installer transmitted during a process of installing the RF connector 200 between the first substrate 1 and the second substrate 2.

More specifically, as illustrated in FIGS. 1 to 3, the RF connector 200 may include: a fixed terminal part 201 having a hollow portion 202; one terminal part 210 fixed to one end of the fixed terminal part 201 and configured to be elastically supported on the first substrate 1, one terminal part 210 being configured to slip and come into contact with an inner surface of the first substrate 1; and the other terminal part 220 fixed to the other end of the fixed terminal part 201 and configured to be elastically supported on the second substrate 2, the other terminal part 220 being configured to slip and come into contact with an inner surface of the second substrate 2.

In this case, as illustrated in FIGS. 1 and 2, one terminal part 210 and the other terminal part 220 may be elastically supported by an elastic member 230 installed in the hollow portion 202 of the fixed terminal part 201 and configured to be extended or contracted.

When the first and second substrates 1 and 2 are assembled to face each other so that opposing surfaces of the first and second substrates 1 and 2 are in close contact with each other in the state in which one terminal part 210 and the other terminal part 220 are respectively coupled to one end and the other end of the fixed terminal part 201, one terminal part 210 and the other terminal part 220 may absorb assembling tolerance existing between the two substrates 1 and 2 while slipping to overlap one end and the other end of the fixed terminal part 201 by predetermined distances L1 and L2.

As illustrated in FIG. 2, in the RF connector 200, one terminal part 210 and the other terminal part 220 are fixed between the first and second substrates 1 and 2 in the state in which one terminal part 210 and the other terminal part 220 are respectively coupled to one end and the other end of the fixed terminal part 201. When the first and second substrates 1 and 2 are assembled to face each other so as to be in close contact with each other, a contact point end 217 of one terminal part 210 and a contact point end 227 of the other terminal part 220 may respectively come into contact with a contact surface of the first substrate 1 and a contact surface of the second substrate 2.

In this case, as illustrated in FIG. 3, one terminal part 210 may have a hollow portion 213 into which one end of the fixed terminal part 201 is inserted. Further, the other terminal part 220 may have a hollow portion 223 into which the other end of the fixed terminal part 201 is inserted. One terminal part 210 and the other terminal part 220 may hook-engage with the ends of the fixed terminal part 201 while surrounding outer peripheral surfaces of the ends of the fixed terminal part 201.

To this end, as illustrated in FIGS. 3 and 4A, inward hook ribs 214 and 224 may protrude toward a center from inner peripheral surfaces of the hollow portions 213 and 223 of one terminal part 210 and the other terminal part 220, the inner peripheral surfaces being adjacent to the outside. Outward hook ribs 204-1 and 204-2 may radially protrude from outer peripheral surfaces of the ends of the fixed terminal part 201.

One terminal part 210 and the other terminal part 220 may slip to overlap the ends of the fixed terminal part 201 by predetermined lengths when the first and second substrates 1 and 2 are assembled to be in close contact with each other in the state in which one terminal part 210 and the other terminal part 220 are coupled so as not to be separated from the fixed terminal part 201 by the hook-engagement between the inward hook ribs 214 and 224 of the ends of the fixed terminal part 201 and the outward hook ribs 204-1 and 204-2. The lengths (see reference numerals 'L1' and 'L2' in FIG. 2) by which one terminal part 210 and the other terminal part 220 may overlap the ends of the fixed terminal part 201 may mean maximum lengths that allow one terminal part 210 and the other terminal part 220 to absorb the assembling tolerance between the first and second substrates 1 and 2.

As illustrated in FIGS. 1 to 3, one terminal part 210 and the other terminal part 220 may be coupled to the ends of the fixed terminal part 201 by the hook-engagement.

More specifically, when the ends of the fixed terminal part 201 are inserted into the hollow portion 213 and 223 by moving any one of one terminal part 210 and the other terminal part 220 to any one of the ends of the fixed terminal part 201 as illustrated in FIG. 3A, the inward hook rib 214 of one terminal part 210 and the outward hook rib 204-1 of the fixed terminal part 201 may hook-engage with each other at the same time when one side of the end of the fixed terminal part 201 is inserted into the hollow portion 213 of one terminal part 210, and the inward hook rib 224 of the other terminal part 220 and the outward hook rib 204-2 of the fixed terminal part 201 may hook-engage with each other at the same time when the other side of the end of the fixed terminal part 201 is inserted into the hollow portion 223 of the other terminal part 220, for example, as illustrated in FIGS. 3B and 3C.

To implement the smooth hook engagement between the inward hook ribs 214 and 224 and the outward hook ribs 204-1 and 204-2, the inward hook ribs 214 and 224 may each have an inner diameter that gradually increases toward the inside of each of the hollow portions 213 and 223, and the outward hook ribs 204-1 and 204-2 may each have an outer diameter that gradually increases toward the inside of the hollow portion 202 of the fixed terminal part 201.

As the inward hook ribs 214 and 224 and the outward hook ribs 204-1 and 204-2 respectively engage with one another, an elastic force of the elastic member 230 inserted into the hollow portion 202 of the fixed terminal part 201 may prevent one terminal part 210 and the other terminal part 220 from being separated from each other.

In this case, one terminal part 210 and the other terminal part 220 may slip and move the predetermined distances L1 and L2 toward one side of the fixed terminal part 201 based on a longitudinal direction in the state in which one terminal part 210 and the other terminal part 220 are fixed in the space between the first and second substrates 1 and 2 so that the fixed terminal part 201 is not moved. The movement distances (see reference numerals L1 and L2 in FIG. 2) of one terminal part 210 and the other terminal part 220 may serve to easily implement electrical connection while compensating for assembling tolerance existing between the first and second substrates 1 and 2 or a difference in heights between peripheral components mounted on the first or second substrate 1 or 2.

Further, the slipping movement amount of one terminal part 210 and the other terminal part 220 may be restricted between limited points of the compression amount of the elastic member 230 and hook-engagement portions of the inward hook ribs 214 and 224 of one terminal part 210 and the other terminal part 220 and the outward hook ribs 204-1 and 204-2 of the fixed terminal part 201.

As illustrated in FIGS. 1 to 3, in the connecting apparatus according to the embodiment of the present invention, the structure is described and illustrated, in which one end and the other end of the fixed terminal part 201 are respectively inserted into the hollow portion 213 of one terminal part 210 and the hollow portion 223 of the other terminal part 220 (see FIG. 4A). However, as illustrated in FIG. 4B, a structure in which a part of one terminal part 210 and a part of the other terminal part 220 are respectively inserted into one side and the other side of the ends of the hollow portion 202 of the fixed terminal part 201 and then hook-engage with the fixed terminal part 201 does not depart from the protection scope of the present invention. In this case, outward hook ribs 214' and 224' may be respectively formed on outer peripheral surfaces of one terminal part 210 and the other terminal part 220, and inward hook ribs 204-1' and 204-2' may be respectively formed on inner peripheral surfaces of one side and the other side of the ends of the hollow portion 202 of the fixed terminal part 201.

Meanwhile, as illustrated in FIGS. 1 to 3, a part of the outer peripheral surface of each of one terminal part 210 and the other terminal part 220, which surrounds each of the ends of the fixed terminal part 201, may each have a plurality of cut-out portions 215 and 225 formed by being cut in the longitudinal direction and spaced apart from one another in a circumferential direction.

The cut-out portions 215 and 225 of one terminal part 210 and the other terminal part 220 may provide predetermined tensional force applied inward, and the predetermined tensional force may be defined as a force for adding lateral tension that brings one terminal part 210 and the other terminal part 220 into contact with an outer peripheral side of the fixed terminal part 201 provided to be accommodated in the hollow portions 213 and 223 of one terminal part 210 and the other terminal part 220.

In this case, the 'lateral tension' may mean a contact force applied in a lateral direction between the terminal parts to prevent disconnection of a flow of electricity in the RF connector 200 in which one terminal part 210, the other terminal part 220, and the fixed terminal part 201 are separated without being integrated.

For example, unlike the embodiment of the present invention, in the case of an integrated RF connector (not illustrated) that is deformed in external shape by a close-contact force between the first and second substrates 1 and 2, the RF connector needs to be configured as an elastic body that is partially and elastically deformed by receiving a predetermined assembling force from an assembler to eliminate the assembling tolerance between the first and second substrates 1 and 2. The integrated RF connector does not require the structure for adding the separate lateral tension for preventing the disconnection of the flow of elasticity between one end and the other end.

However, in the embodiment of the present invention, the RF connector 200 is provided such that one terminal part 210, the other terminal part 220, and the fixed terminal part 201, to which one terminal part 210 and the other terminal part 220 are separated. The overall length of one terminal part 210 and the other terminal part 220 is decreased or increased as one terminal part 210 and the other terminal part 220 move to respectively overlap the ends of the fixed terminal part 201 to absorb the assembling tolerance. To prevent the disconnection of the flow of elasticity, it is essential to separately change the shapes of one terminal part 210 and the other terminal part 220 to add the lateral tension.

The cut-out portions 215 and 225 are formed by partially cutting the outer peripheral surfaces of one terminal part 210 and the other terminal part 220 and add the predetermined elastic force to the inside (i.e., the outer peripheral surface of the fixed terminal part 201), such that a kind of close-contact force is generated with respect to the outer peripheral surface of the fixed terminal part 201. Therefore, it is possible to prevent the disconnection of the flow of elasticity even when one terminal part 210 and the other terminal part 220 move the predetermined distances L1 and L2 relative to the fixed terminal part 201.

Meanwhile, the elastic member 230 inserted into the hollow portion 202 of the fixed terminal part 201 serve to elastically support one terminal part 210 toward the first substrate 1 and elastically support the other terminal part 220 toward the second substrate 2.

In this case, the elastic member 230 may be provided to completely penetrate the hollow portion 202 of the fixed terminal part 201. The elastic member 230 is sized such that one end and the other end of the elastic member 230 are respectively exposed to one end and the other end of the fixed terminal part 201 in the state in which the elastic member 230 is extended.

One end of the elastic member 230 may be supported on an inner end of the hollow portion 213 of one terminal part 210, and the other end of the elastic member 230 may be supported on an inner end of the hollow portion 223 of the other terminal part 220.

In this case, the elastic member 230 may be provided as a spring having one end supported by being inserted into the hollow portion 213 of one terminal part 210, and the other end supported by being inserted into the hollow portion 223 of the other terminal part 220. The elastic member 230 provided as a spring may be inserted in a compressed state to continuously provide the elastic force to one terminal part 210 and the other terminal part 220 in the state in which one terminal part 210 and the other terminal part 220 respectively hook-engage with the ends of the fixed terminal part 201 and no external force, such as a separate assembling force, is provided.

Figure 5A:
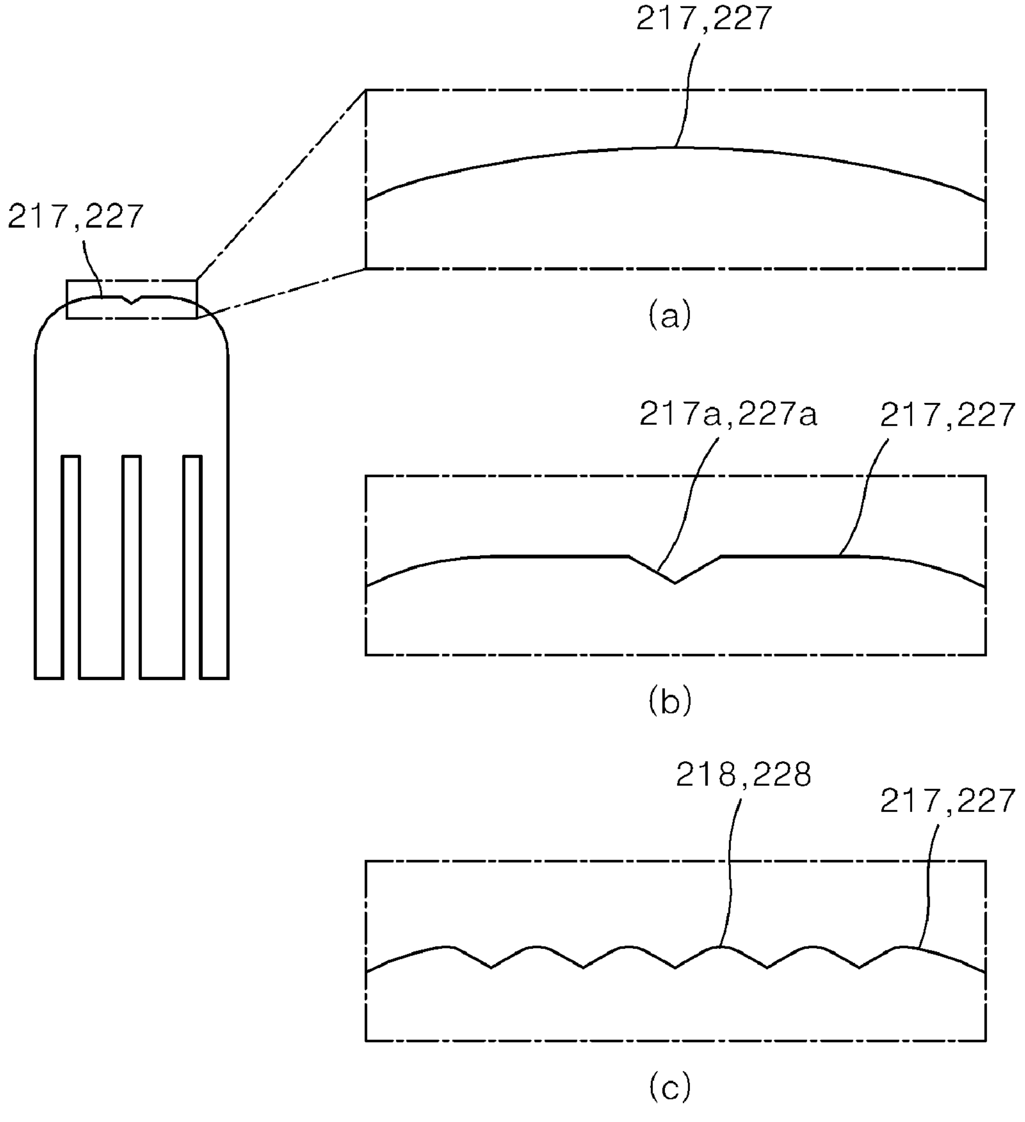
FIG. 5A and FIG. 5B are cross-sectional and top plan views illustrating various embodiments of cross-sections of contact points of one terminal part and the other terminal part among the components in FIGS. 1 and 2.
Figure 5B:
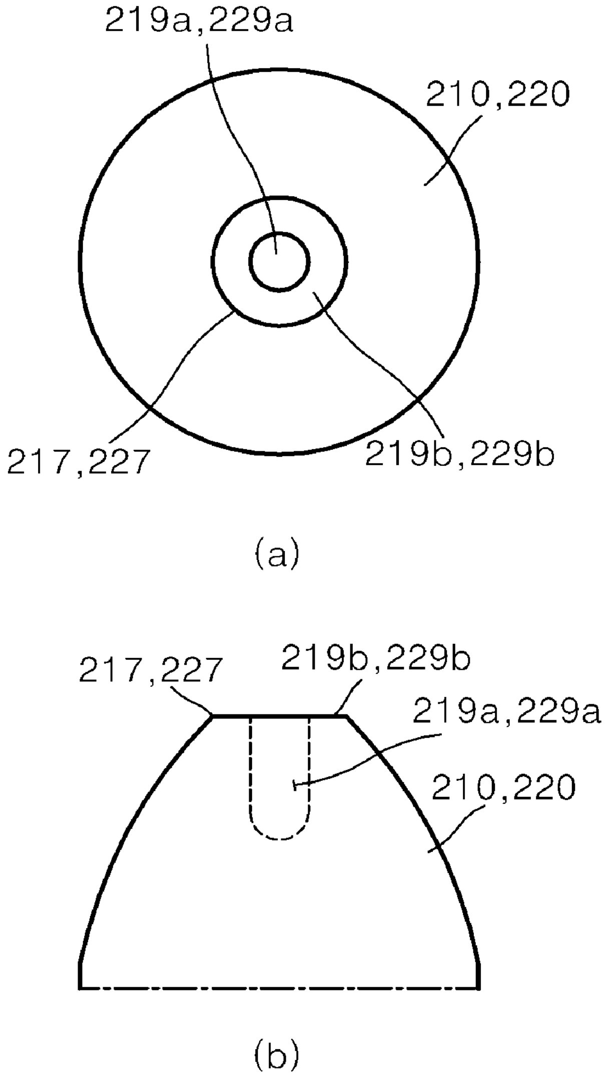

FIG. 5A and FIG. 5B are cross-sectional and top plan views illustrating various embodiments of cross-sections of contact points of one terminal part and the other terminal part among the components in FIGS. 1 and 2.

The contact point end 217 of one terminal part 210, which is configured to come into contact with the first substrate 1, and the contact point end 227 of the other terminal part 220, which is configured to come into contact with the second substrate 2, may each be rounded to implement a single contact point, as illustrated in FIG. 5A (a).

However, the shape of the contact point end 217 of one terminal part 210 and the shape of the contact point end 227 of the other terminal part 220 are not limited to the above-mentioned shapes. As illustrated in FIG. 5A (b), the contact point end 217 of one terminal part 210 and the shape of the contact point end 227 of the other terminal part 220 may each be rounded to implement two or four point contact points by at least one or two partition grooves 217*a* and 227*a*.

Further, as illustrated in FIG. 5A (c), the contact point end 217 of one terminal part 210 and the contact point end 227 of the other terminal part 220 may each include a plurality of protrusion portions 218 and 228 protruding to implement at least two point contact points.

The shape of the contact point end 217 of one terminal part 210 and the shape of the contact point end 227 of the other terminal part 220 may be designed and adopted as an optimal shape in consideration of a contact point pressure or the like with respect to the first and second substrates 1 and 2 that are contact point objects.

Because the contact point end 217 of the one terminal part 210 and the contact point end 227 of the other terminal part 220 are each divided into the plurality of contact point regions as described above, it is possible to achieve an advantage of improving a rate of transmission of an electrical signal by means of the fixed terminal part 201 and reduce a transmission loss.

Further, as illustrated in FIG. 5B, the contact point end 217 of one terminal part 210, which is configured to come into contact with the first substrate 1, and the contact point end 227 of the other terminal part 220, which is come into contact with the second substrate 2 may respectively include recessed contact point grooves 219*a* and 229*a* and contact point flat surfaces 219*b* and 229*b* formed to be flat at the periphery of the contact point grooves 219*a* and 229*a*. The contact point grooves 219*a* and 229*a*, which are respectively formed at centers of the contact point end 217 of one terminal part 210 and the contact point end 227 of the other terminal part 220 may improve contact point ratios in respect to the contact point flat surface 219*b* and 229*b* at the periphery of the contact point grooves 219*a* and 229*a*.

Figure 6:
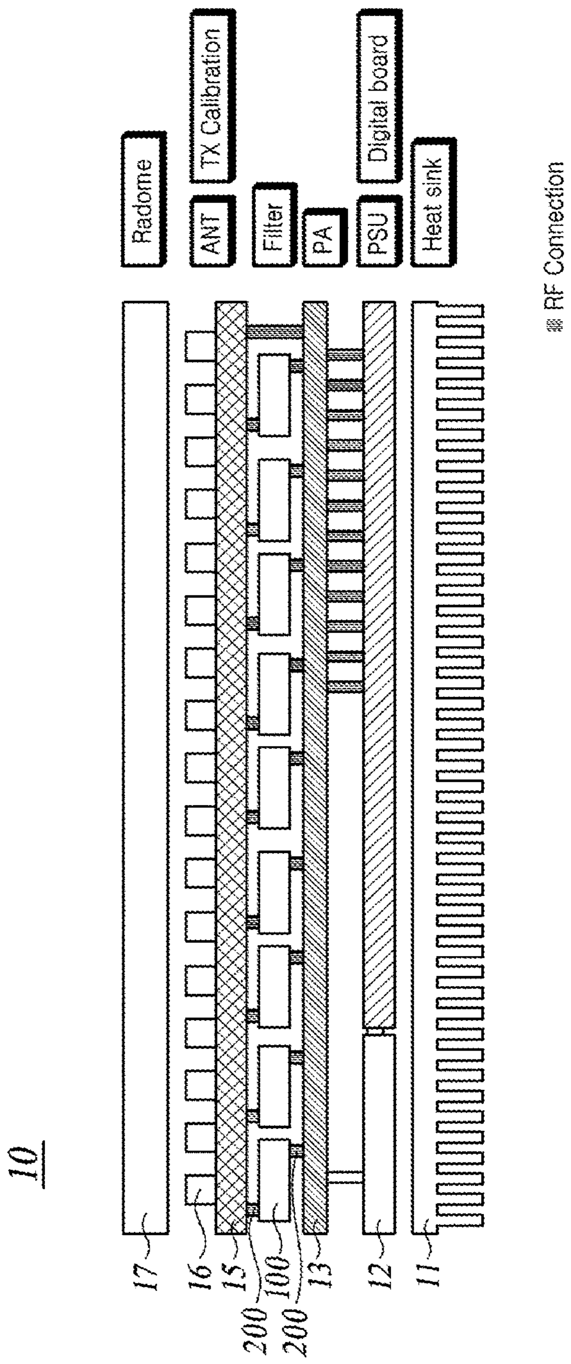
FIG. 6 is a schematic view illustrating a stack structure of an exemplary massive MIMO antenna.
Figure 7:
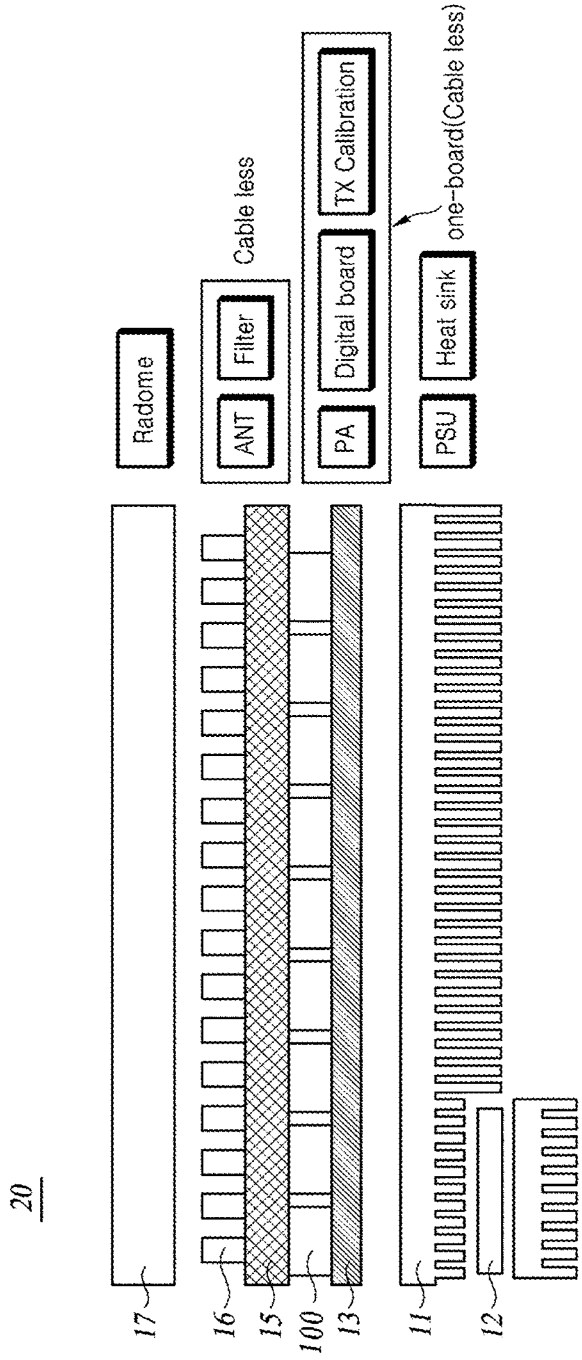
FIG. 7 is a cross-sectional view illustrating a state in which a cavity filter according to another embodiment of the present invention is stacked between an antenna board and a relevant PCB.

FIG. 6 is a schematic view illustrating a stack structure of an exemplary massive MIMO antenna, and FIG. 7 is a cross-sectional view illustrating a state in which a cavity filter according to another embodiment of the present invention is stacked between an antenna board and a relevant PCB.

In general, in the embodiment of the connecting apparatus according to the present invention, a field in which a large number of RF connectors 200, which are each provided between the first and second substrates 1 and 2 to connect an electrical signal, are required may be an MIMO (multiple-input multiple-output) technical field.

The MIMO technology refers to a technology that innovatively increases data transmission capacities by using a plurality of antennas. Eight antennas are used in 4G LTE-advanced, and a product equipped with 64 or 128 antennas has been developed in a current pre-5G step. It is expected that base station equipment having a much larger number of antennas will be used in 5G, which refers to a massive MIMO technology.

In the massive MIMO technology, the number of transmitters and the number of filters are increased as the number of antenna elements is increased. Therefore, recently, a cavity filter structure, which facilitates mounting while minimizing a mounting space, has been actively studied. Meanwhile, it is essential to perform the development of the RF connector 200 that connects the modular cavity filter or the cavity filter with the relevant PCB to enable the connection of the electrical signal between the relevant PCB and the antenna board having the antenna element.

As illustrated in FIG. 6, an antenna apparatus 10 includes a housing 11 having a heat sink, and a radome 17 coupled to the housing 11. An antenna assembly 16 is embedded between the housing 11 and the radome 17.

For example, a power supply unit (PSU) 12 is coupled in the housing 11 by means of a docking structure. The power supply unit 12 provides operating power for operating electronic components provided in the antenna assembly 16. Typically, the antenna assembly 16 has a structure in which the typical RF connectors 200, which corresponds in number to the antenna elements, are disposed on a rear surface of the antenna board 15 having the plurality of antenna elements arranged on a front surface thereof, and then the relevant PCB 13 is stacked.

Meanwhile, as illustrated in FIG. 7, because the modular cavity filter 100 is provided instead of the typical RF connector 200, it is possible to provide the antenna structure 20 that is easier to connect and has a lower height profile.

As illustrated in FIGS. 6 and 7, the connecting apparatus according to another embodiment of the present invention is a specific embodiment in which the RF connector 200, which connects the antenna board and the relevant PCB 13, is provided instead of the cavity filter 100 or the RF connector 200, which serves to connect electrical signals of the cavity filter 100 and the relevant PCB 13 is provided.

Figure 8:
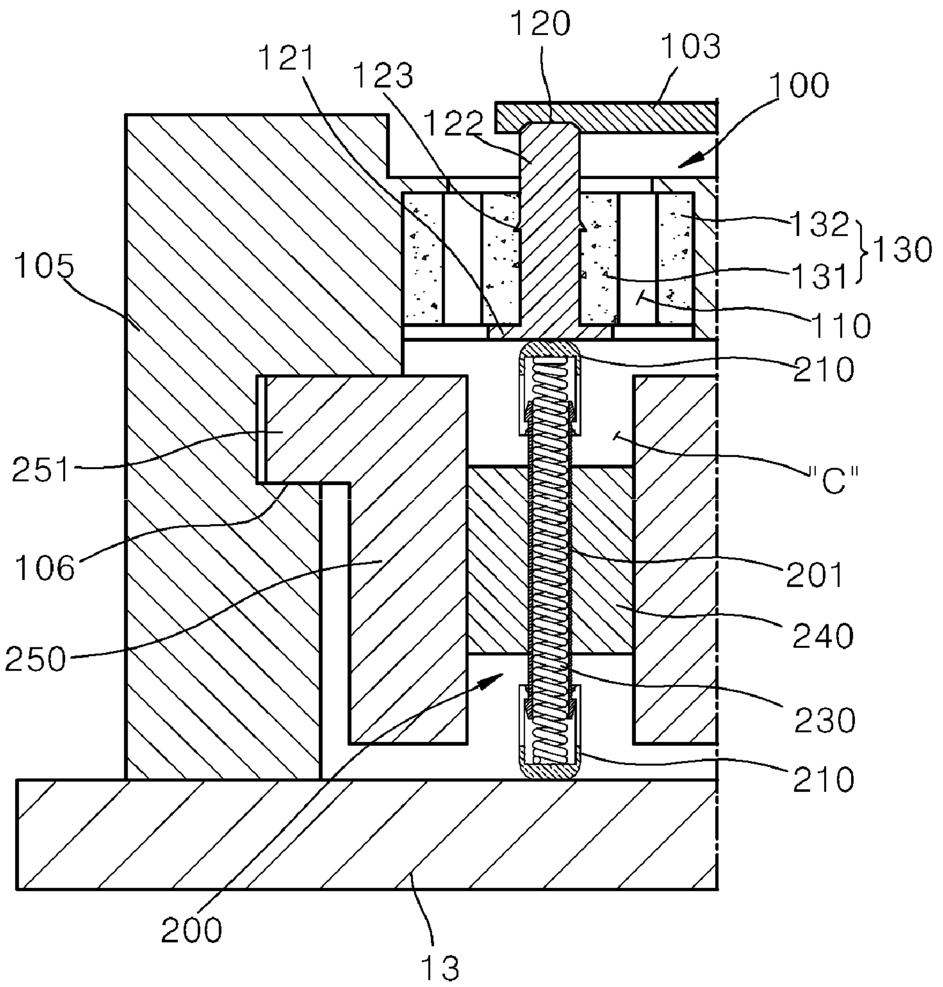
FIG. 8 is a cross-sectional view illustrating an external installation appearance of another embodiment of the connecting apparatus according to the present invention.

FIG. 8 is a cross-sectional view illustrating an external installation appearance of another embodiment of the connecting apparatus according to the present invention.

The connecting apparatus according to another embodiment of the present invention may include the cavity filter 100 and the RF connector 200.

The cavity filter 100 is used as a high-power channel wave filter for a transmitter and serves to select a transmission frequency for each channel while inhibiting a spurious wave signal. That is, the cavity filter 100 serves to filter a frequency of a signal received through the antenna element and a frequency of a signal to be transmitted through the antenna element while electrically connecting the relevant PCB 13 and the resonant element 103 connected to an antenna substrate (not illustrated) having a plurality of antenna elements.

The cavity filter 100 has a cavity in the form of a predetermined impedance matching space 110 to prevent a change in inherent frequency characteristics even in a temperature environment at a low temperature or a high temperature, and the cavity filter 100 has a resonant element 103 such as a dielectric resonator or a metal rod. Meanwhile, a terminal pin side dielectric material 130 having predetermined permittivity is inserted into the impedance matching space 110 to design impedance matching that allows only the electronic device having an inherent frequency to exist, thereby enabling resonance with an ultra-high frequency.

As illustrated in FIG. 8, the cavity filter 100 is provided in the form of a single connecting module between the antenna substrate and the relevant PCB 13 and facilitates the connection of the electrical signal between the antenna substrate and the relevant PCB 13.

More specifically, as illustrated in FIG. 8, the cavity filter 100 includes a filter main body casing 105 having therein the impedance matching space 110 and provided between the antenna substrate and the relevant PCB 13.

Further, the cavity filter 100 may further include a terminal pin 120 provided in the filter main body casing 105. One side of the terminal pin 120 is fixed to the resonant element 103 instead of the terminal pin side dielectric material 130, and the terminal pin 120 is fixed in the impedance matching space 110 provided to match impedance in the radial direction.

To implement uniform frequency characteristics, the impedance matching space 110 is provided in the form of an empty space having an approximately cylindrical shape, and the terminal pin 120 may be fixed in the impedance matching space 110. Further, the terminal pin 120 may be formed in a flat-head screw shape having a head portion at the side of the relevant PCB 13. Hereinafter, for convenience of description, the head portion of the terminal pin 120 will be referred to as a 'relevant PCB side' or 'the other end', and the pin portion corresponding to one end 122 of the terminal pin 120 will be referred to as an 'antenna board side' or 'one end'.

An outer surface area of the other end 121 of the terminal pin 120 may be larger than an outer surface area of one end (more specifically, the contact point end 217 of one terminal part 210) of the RF connector 200 to be described below. This is to increase a contact point ratio of one end of the RF connector 200 because the terminal pin 120 is provided as a conductor.

As illustrated in FIG. 8, the terminal pin side dielectric material 130 may include: a first terminal pin side dielectric material 131 having a cylindrical shape and having a center penetrated by the terminal pin 120; and a second terminal pin side dielectric material 132 spaced apart outward from the first terminal pin side dielectric material 131 by a predetermined distance and provided to be in close contact with an inner peripheral surface of the impedance matching space 110. In another embodiment of the present invention, the shape of the terminal pin side dielectric material 130, which is one of the components of the cavity filter 100, is limited to the standardized shape. However, the shape of the terminal pin side dielectric material 130 may, of course, be designed to have various shapes for matching impedance in the impedance matching space 110.

The terminal pin side dielectric material 130 is fitted with the terminal pin 120 to cover the outer peripheral surface of the terminal pin 120 like the first terminal pin side dielectric material 131, or the terminal pin side dielectric material 130 is inserted to be disposed in the radial direction of the outer peripheral surface of the terminal pin 120 like the second terminal pin side dielectric material 132, such that the impedance matching may be designed. Meanwhile, the first terminal pin side dielectric material 131 of the dielectric material 130 may be moved in the impedance matching space 110 together with the terminal pin 120 by a fixing rim 123 formed on an outer peripheral surface of the pin portion of the terminal pin 120.

The specific configuration of the RF connector 200 is substituted with the above description of the connecting apparatus according to the embodiment of the present invention. However, there is a difference in that the relevant PCB 13 is provided instead of the first substrate 1, and the cavity filter 100 is provided instead of the second substrate 2.

In addition, the connecting apparatus according to another embodiment of the present invention provides an advantage in designing impedance matching because the RF connector 200 is provided outside the cavity filter 100 regardless of the impedance matching space 110.

Further, as illustrated in FIG. 8, in the connecting apparatus another embodiment of the present invention, a cavity C corresponding to the outside of the impedance matching space 110 of the cavity filter 100 is fitted with the fixed terminal part 201 to cover a part of the outer peripheral surface of the fixed terminal part 201 of the RF connector 200, or the fixed terminal part side dielectric material 240 is inserted into the cavity so as to be disposed in the radial direction of the outer peripheral surface of the fixed terminal part 201, which makes it possible to design impedance matching.

In this case, the RF connector 200 may further include a fixing block 250 configured to fix the fixed terminal part 201, by means of the fixed terminal part side dielectric material 240, in the cavity C corresponding to the outside of the impedance matching space 110 of the cavity filter 100.

A catching portion 251 of the fixing block 250 is fixed by being caught by a catching end 106 formed inside the cavity C of the filter main body casing 105, such that a motion may be restricted in the cavity C.

A process of installing the connecting apparatus according to the embodiment of the present invention configured as described above will be briefly described with reference to the accompanying drawings (particularly, FIG. 8). To provide a more specific description, the present invention will be described with reference to another embodiment of the present invention.

First, one end of the terminal pin 120 of the cavity filter 100 is fixed to each of the resonant elements 103 extending from and connected to the antenna board.

Next, the fixed terminal part 201, among the components of the RF connector 200, is fixed to the relevant PCB 13 by fixing the catching portion 251 to the catching end 106 in the space of the cavity C corresponding to the outside of the impedance matching space 110 by means of the fixed terminal part side dielectric material 240 and the fixing block 250.

In this case, the contact point end 217 of the one terminal part 210, which is installed to hook-engage with one end of the fixed terminal part 201 and be elastically supported by one end of the elastic member 230, may come into elastic contact with the other end 121 corresponding to the head portion of the terminal pin 120.

Next, when a predetermined assembling force is applied by bringing the entire relevant PCB 13 into close contact with the cavity filter 100, the contact point end 227 of the other terminal part 220, which is installed to hook-engage with the other end of the fixed terminal part 201 and be elastically supported by the other end of the elastic member 230, slips by a predetermined assembling force applied when the contact point end 227 comes into contact with the contact surface of the relevant PCB 13, such that the assembling tolerance may be absorbed by the slipping distance.

The connecting apparatus according to the present invention configured as described above provides an advantage of allowing the RF connector 200 to easily copes with assembling tolerance in the outer space regardless of the cavity filter 100.

Further, the terminal pin 120 having a comparatively simple shape may be installed in the impedance matching space 110 of the cavity filter 100, and the mobility of the terminal pin 120 may be designed to be very low, which makes it easy to design impedance matching.

The embodiments of the connecting apparatus according to the present invention have been described in detail above with reference to the accompanying drawings. However, the present invention is not necessarily limited by the embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the connecting apparatus capable of connecting an electrical signal between the two substrates (or the two contact surfaces) provided to face each other and easily absorbing assembling tolerance between the two substrates (or the two contact surfaces).

The invention claimed is:

1. A connecting apparatus comprising:

a fixed terminal part having a hollow portion and fixed in a predetermined space between a first substrate, on which electrical components are mounted, and a second substrate disposed in parallel with the first substrate;

one terminal part fixed to one end of the fixed terminal part and configured to be elastically supported on the first substrate, one terminal part being configured to slip and come into contact with an inner surface of the first substrate; and the other terminal part fixed to the other end of the fixed terminal part and configured to be elastically supported on the second substrate, the other terminal part being configured to slip and come into contact with an inner surface of the second substrate, wherein one terminal part and the other terminal part are elastically supported by an elastic member installed in the hollow portion of the fixed terminal part and configured to be extended or compressed, wherein one terminal part and the other terminal part respectively have hollow portions into which ends of the fixed terminal part are inserted, and one terminal part and the other terminal part respectively hook-engage with the fixed terminal part while surrounding outer peripheral surfaces of the ends of the fixed terminal part.

2. The connecting apparatus of claim 1, wherein one terminal part and the other terminal part are coupled to overlap ends of the fixed terminal part by predetermined distances in a longitudinal direction.

3. The connecting apparatus of claim 1, wherein one terminal part and the other terminal part each have a plurality of cut-out portions formed by cutting a part of an outer peripheral surface of a portion of each of one terminal part and the other terminal part, which is coupled to the fixed terminal part, in a longitudinal direction, and the plurality of cut-out portions is spaced apart from one another in a circumferential direction.

4. The connecting apparatus of claim 1, wherein a contact point end of one terminal part, which is configured to come into contact with the first substrate, and a contact point end of the other terminal part, which is configured to come into contact with the second substrate, each include a plurality of protrusion portions protruding to implement at least two point contact points.

5. The connecting apparatus of claim 1, wherein a contact point end of one terminal part, which is configured to come into contact with the first substrate, and a contact point end of the other terminal part, which is configured to come into contact with the second substrate, each include a contact point groove formed to be recessed, and a contact point flat surface formed to be flat at the periphery of the contact point groove.

6. A connecting apparatus comprising:

a fixed terminal part having a hollow portion and fixed in a predetermined space between a first substrate, on which electrical components are mounted, and a second substrate disposed in parallel with the first substrate;

one terminal part fixed to one end of the fixed terminal part and configured to be elastically supported on the first substrate, one terminal part being configured to slip and come into contact with an inner surface of the first substrate; and the other terminal part fixed to the other end of the fixed terminal part and configured to be elastically supported on the second substrate, the other terminal part being configured to slip and come into contact with an inner surface of the second substrate, wherein one terminal part and the other terminal part are elastically supported by an elastic member installed in the hollow portion of the fixed terminal part and configured to be extended or compressed, wherein one terminal part and the other terminal part respectively have hollow portions into which ends of the elastic member are inserted and supported, and one terminal part and the other terminal part are inserted into the hollow portion of the fixed terminal part while overlapping the fixed terminal part and respectively hook-engage with inner sides of inlet ends of the hollow portion of the fixed terminal part.

7. The connecting apparatus of claim 6, wherein the elastic member is provided as an integrated spring having one end inserted and supported in the hollow portion of one terminal part, and the other end inserted and supported in the hollow portion of the other terminal part.

8. A connecting apparatus comprising:

a cavity filter having one side fixed to a resonant element and having a terminal pin fixed in an impedance matching space provided to match impedance in a radial direction; and an RF connector configured to absorb assembling tolerance between the terminal pin and a relevant PCB and fixed in the impedance matching space between the terminal pin and the relevant PCB disposed in parallel with and spaced apart, by a predetermined distance, from the resonant element, wherein the RF connector comprises:

a fixed terminal part having a hollow portion;

one terminal part fixed to one end of the fixed terminal part and configured to be elastically supported on the terminal pin, one terminal part being configured to slip and come into contact with a contact surface of the terminal pin; and the other terminal part fixed to the other end of the fixed terminal part and configured to be elastically supported on the relevant PCB, the other terminal part being configured to slip and come into contact with a contact surface of the relevant PCB, and wherein one terminal part and the other terminal part are elastically supported by an elastic member installed in the hollow portion of the fixed terminal part and configured to be extended or compressed.

9. The connecting apparatus of claim 8, wherein an outer surface area of the other end of the terminal pin is larger than an outer surface area of one end of one terminal part of the RF connector.

10. The connecting apparatus of claim 8, wherein the impedance matching space of the cavity filter is fitted with the terminal pin to cover a part of an outer peripheral surface of the terminal pin, or a terminal pin side dielectric material is inserted into the impedance matching space so as to be disposed in a radial direction of the outer peripheral surface of the terminal pin, such that impedance matching is designed.

11. The connecting apparatus of claim 8, wherein a cavity, which corresponds to the outside of the impedance matching space of the cavity filter, is fitted with the fixed terminal part to cover a part of an outer peripheral surface of the fixed terminal part of the RF connector, or a fixed terminal part side dielectric material is inserted into the cavity so as to be disposed in a radial direction of the outer peripheral surface of the fixed terminal part, such that impedance matching is designed.

12. The connecting apparatus of claim 11, wherein the RF connector further comprises a fixing block configured to fix the fixed terminal part in the cavity, which corresponds to the outside of the impedance matching space of the cavity filter, by means of the fixed terminal part side dielectric material.

* * * * *